Oct. 20, 1942.   E. P. BULLARD, 3D., ET AL   2,299,302
ATTACHMENT FOR MACHINE TOOLS
Filed Aug. 3, 1940    2 Sheets-Sheet 1

INVENTORS
Edward P. Bullard III
BY Andrew C. Lindmark
Paul M. Geist
ATTORNEY

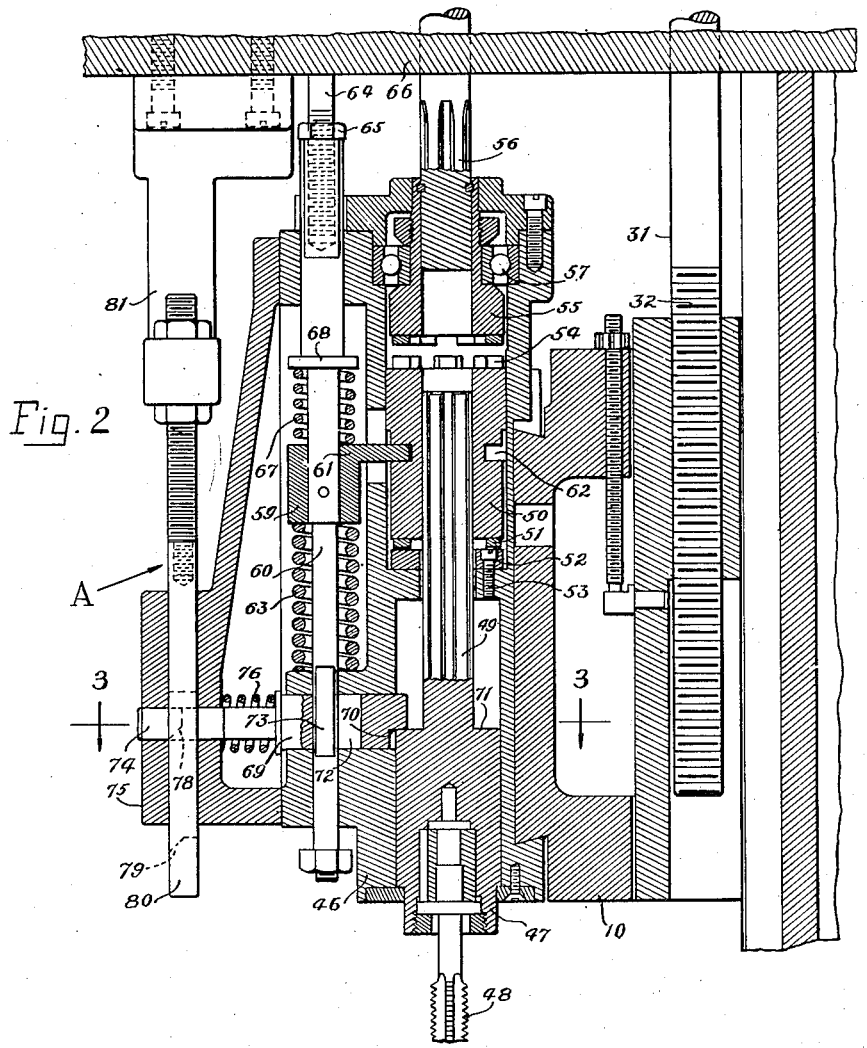

Patented Oct. 20, 1942

2,299,302

UNITED STATES PATENT OFFICE 2,299,302

ATTACHMENT FOR MACHINE TOOLS

Edward P. Bullard, III, Fairfield, and Andrew C. Lindmark, Bridgeport, Conn., assignors to The Bullard Company, a corporation of Connecticut Application August 3, 1940, Serial No. 350,574

17 Claims. (Cl. 10—129)

This invention relates to a tapping attachment for machine tools of the type that is adapted repeatedly to perform a cycle of operation in which a tool is fed into engagement with work at a relatively slow rate of speed proportional to the speed of rotation of work-supporting means, and in which said tool is traversed toward and away from the work at a relatively fast rate of speed that is not proportional to the speed of rotation of the work-supporting means.

Collapsible tapping devices are frequently employed with machine tools of the above type; however, such devices are limited in diameter by their construction, and taps of less diameter than this limit must be solid. Solid taps require relative reversal of movement with respect to the rotating work in order to be removed therefrom. When a positive feed is employed in both directions, the reversal of the rotation and axial movement of the tap must be simultaneous, otherwise the threads will be damaged. Furthermore, the rate of speed of rotation of the tap in removing it from the work must not be excessive, otherwise the friction between the threads of the work and the tap will burn the latter.

An object of this invention is to provide a tapping attachment for the above-described type of machine tool in which a solid tap may be employed without encountering the above-mentioned objections to prior known tapping attachments.

Other objects include, the provision of a tapping attachment for a machine tool that will feed the tap into engagement with work at a relatively slow rate during tapping, and remove the tap from the work at a relatively fast rate without damaging the threads; the provision of a tapping attachment for a machine tool in which the feed of the tap into, and its removal from the work is effected by a motor and transmission that rotate in only one direction; the provision of a tapping attachment for a machine tool in which the tool is fed into engagement with the work by positive feeding means and withdrawn from the work by impositive feeding means; and the provision of a tapping attachment for a machine tool of the type that repeatedly performs a cycle of operation, in which the tapping cycle of operation includes positively feeding the tap into the work, impositively retracting it from the work and automatically re-setting the attachment for positive feeding.

The above, as well as other objects and novel features of the invention will become apparent from a consideration of the following specification and accompanying drawings, in which:

Figure 2 is an enlarged sectional view of a part of the apparatus shown in Fig. 1; and Figure 3 is a sectional view taken substantially along line 3—3 of Fig. 2.

Figure 1:
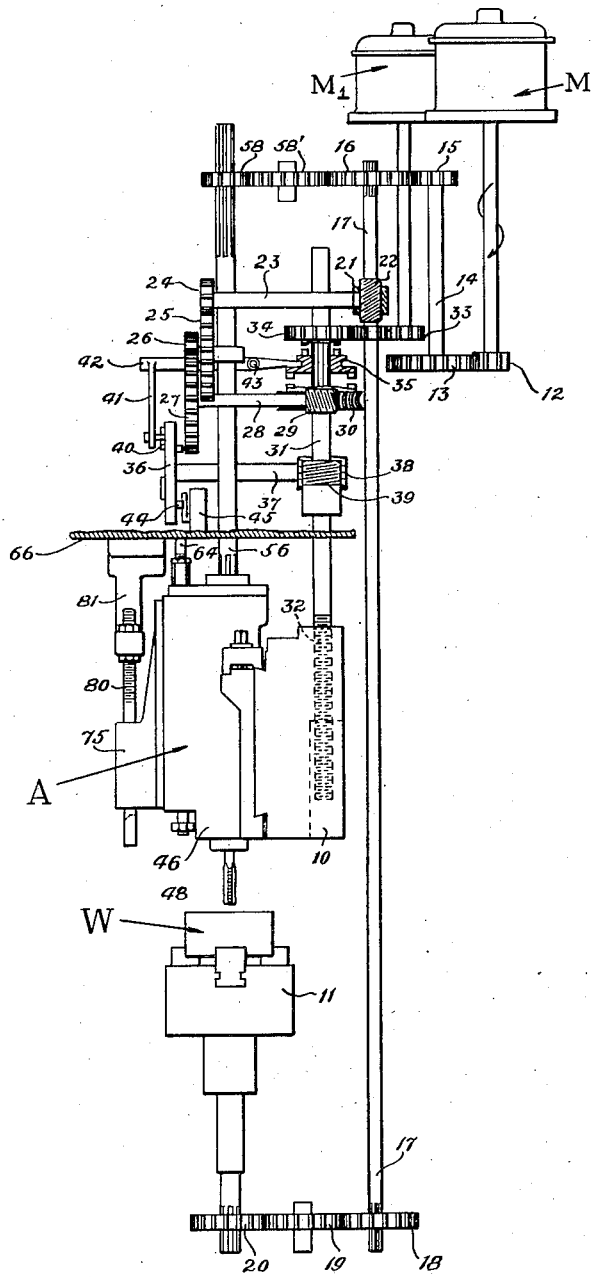
Figure 1 is a diagrammatic illustration of a portion of a machine tool to which the principles of the invention have been applied.

The principles of the invention have been shown and will be described as applied to the type of machine tool disclosed in Patent 2,086,852 granted to Edward P. Bullard et al. on July 13, 1937, and particularly to the apparatus disclosed in Patent 2,086,845 granted to E. C. Bullard on July 13, 1937, to which patents reference is directed for specific details of construction.

Referring to Fig. 1, motor M is adapted to move a saddle 10 toward a spindle 11 at a relatively slow rate of speed that is directly proportional to the rate of rotation of the spindle, and a motor M₁ is adapted to move the saddle toward and away from said spindle 11 at a relatively rapid rate that is unrelated to the rate of rotation of said spindle.

The motor M drives a gear 12 that meshes with a gear 13 keyed on a shaft 14. Another gear 15 on shaft 14 meshes with a gear 16 fixed to the top of shaft 17. Shaft 17 extends downwardly to a point near the bottom of the machine where it fixedly supports a gear 18 that meshes with an idle gear 19 which latter meshes with a gear 20 keyed to the work-supporting spindle 11.

A worm 21 is mounted on shaft 17 near its upper end and it meshes with a worm gear 22 on a shaft 23. A series of change-speed gears 24, 25, 26 and 27 are located between shaft 23 and a shaft 28, which latter supports a worm 29 that meshes with a worm gear 30 journaled on a shaft 31. The shaft 31 is provided with a threaded portion 32 in engagement with a threaded opening in the saddle 10.

Motor M₁ is adapted to drive a spur gear 33 in both directions,—the circuit therefor is fully disclosed and described in Patent 2,086,845. Gear 33 drives a gear 34 through an idler. The gear 34 is journaled on shaft 31. A shiftable clutch 35 is splined on shaft 31 between gears 30 and 34. It is provided with positive engaging teeth that are adapted to engage corresponding teeth on adjacent faces of gears 30 and 34.

It is apparent that shifting clutch 35 into engagement with gear 30 will cause motor M to rotate shaft 31 at a relatively slow rate due to the speed reduction gears 24, 25, 26 and 27; while shifting said clutch into engagement with gear 35 will cause motor M1 to rotate shaft 31 at a relatively rapid rate in either direction depending upon the setting of the circuit for motor M1.

Shifting of clutch 35 is adapted to be effected by the actuation of a timing disc 36 that is adapted to be rotated in direct proportion to the movement of head 10. Accordingly, the disc 36 is fixed to a shaft 37 having a worm 38 keyed thereto. The worm 38 meshes with a worm 39 on shaft 31. A plurality of adjustable dogs 40 on disc 36 are adapted to cooperate with a link 41 connected to one end of a lever 42 that is pivoted at 43. The opposite end of lever 42 engages the clutch 35. Additional adjustable dogs 44 on the side of disc 36, opposite to that on which dogs 40 are mounted, control the operation of a reversing switch 45 within the circuit of motor M1 all as more fully described in Patent 2,086,845.

The dogs 40 and 44 on the timing disc 36 are set to cause the apparatus described to perform the following sequence of operations: Upon release of the timing disc, when a cycle of operation is to be performed, a dog 44 starts the rotation of M1 in a direction to move head 10 downwardly. A dog 40 then causes clutch 35 to move upwardly into engagement with gear 34 causing head 10 to move downwardly at traverse speed. When head 10 arrives at a predetermined position, another dog 40 moves clutch 35 into engagement with gear 30 and the head continues to move downwardly at feeding speed since motor M is rotating continuously while the machine is in operation. A dog 44 then opens the circuit for motor M1. Shortly thereafter, another dog 44 energizes the reversing circuit for motor M1. Finally, as the head 10 arrives at the lowest point it is to reach for the desired operation, a dog 40 moves clutch 35 into engagement with gear 34 thereby effecting upward movement of head 10 at traverse speed. When the head arrives at its upper limit, a dog 44 opens the circuit for motor M1 and the clutch 35 is held in neutral by means disclosed in the above-mentioned Patent 2,086,845 until another cycle is to be performed.

An attachment A is mounted on the saddle 10 and is adapted to be moved therewith for performing a tapping operation on work W mounted on spindle 11. Referring to Fig. 2, it comprises a housing 46 adapted to engage a dove-tail bearing on the saddle 10. A spindle 47, adapted to hold a tap 48, is journaled in the housing 46. The spindle is adapted to be held against rotation in a fixed axial position relatively to said attachment during a tapping operation, after which it is adapted to be rotated in the same direction as, but at a faster rate than that of spindle 11 and to be released for free axial movement for removing the tap from the work.

The spindle 47 is provided with a spline 49 on which a slidable clutch 50 is mounted. The clutch 50 is provided with teeth 51 that are adapted to mesh with teeth on a collar 52 fixed to the housing 46 by a screw 53. The opposite end of clutch 50 is provided with teeth 54 adapted to mesh with the teeth on a clutch element 55 fixed to a shaft 56 that is journaled in a bearing 57 within the upper part of housing 46. Referring to Fig. 1, the shaft 56 extends upwardly through the machine and is provided with a relatively long splined portion adapted slidably to receive a gear 58. Gear 58 meshes with an idler gear 58¹. Gear 58¹ meshes with the gear 16 that is continuously driven by the motor M. Accordingly, the shaft 56 is rotated in the same direction that spindle 11 is rotated at all times the machine is functioning, and the speed of rotation of shaft 56 may be varied by changing the pull-off gears 58 and 58¹.

A clutch shifting element 59 (Fig. 2) fixed to a reciprocable shaft 60, is provided with a finger 61 that projects into an annular slot 62 in the clutch 50. The shaft 60 is resiliently urged upwardly by a spring 63 that seats on a portion of the housing 46 and bears against the element 59. The action of spring 63 normally urges the clutch 50 into engagement with the clutch element 55. The shaft 60 is provided with an adjustable abutment 64 at its upper end that is adapted to be locked in adjusted position by a lock nut 65. As the saddle 10, together with the attachment A, is moved to its upper limiting position, the spindle 47 moves to its lower position therein due to its own weight and the abutment 64 engages the under surface of a stationary supporting member 66. Continued upward movement of the saddle forces shaft 60 downwardly against the action of spring 63 to disengage clutch 50 from clutch element 55 and to engage it with stationary collar 52. A spring 67, of less strength than that of spring 63, is mounted between element 59 and a collar 68 that abuts a shoulder on shaft 60. The construction and mounting of spring 67 permits the movement of shaft 60 to its lower limit even though the teeth of clutch 50 and those of collar 52 land tooth-on-tooth.

When clutch 50 is in engagement with stationary collar 52 and spindle 47 is in its lower position within the attachment, the apparatus is in position to be moved downwardly for performing a tapping operation. The clutch 50 and spindle 47 must be locked in this set position, otherwise as head 10 moved downwardly, spring 63 would disengage the clutch from the collar 52 and as tap 48 engaged the work, the spindle 47 would move upwardly within the attachment The locking means comprises a reciprocable plunger 69 having a shoulder 70 adapted to engage a shoulder 71 on the spindle 47 only when the spindle is in its lower position within the attachment. Referring to Fig. 3, the plunger 69 includes an irregularly-shaped opening 72 through which the shaft 60 is adapted to reciprocate under certain conditions. The shaft 60 is provided with a flat portion 73 adapted to register with a portion of the irregularly-shaped opening 72 when the plunger 69 is in locking position. However, when plunger 69 is moved to the left in Figs. 2 and 3, shaft 60 and spindle 47 are capable of axial movement.

The plunger 69 includes a tail-rod 74 slidably mounted in a bearing in a cover 75 for housing 46. A spring 76 is located between cover 75 and a shoulder on plunger 69 tending to move it into locking position. As shown in Fig. 3, the tail-rod 74 is undercut at 77 providing a cam 78 adapted to cooperate with a cam 79 formed on an adjustably-mounted stationary shaft 80. The shaft 80 is adjustably secured to a bracket 81 mounted on the stationary supporting member 66. The vertical position of cam 79 on shaft 80 determines the depth to which tap 48 is fed into the work W, and as cam 79 engages cam 78, plunger 69 is withdrawn from locking position to thereby permit spring 63 to raise shaft 60 and clutch 50 so that the latter engages clutch element 55 whereby tap 48 is rotated in the same direction as, but at a faster rate than that of spindle 11. Consequently, tap 48 is caused to "walk out" of the tapped work, and the saddle 10 and attachment are in condition to be moved away from the work by motor M₁.

*Operation*

Assume that the apparatus is in the position shown in the drawings, that motor M is rotating, that motor M₁ is idle, and that the means shown in the patents mentioned has released the disc 36 for controlling a tapping cycle of operation. A dog 44 on disc 36 starts motor M₁ for down traverse of saddle 10, and shortly thereafter a dog 40 on said disc moves lever 42 to shift clutch 35 into engagement with the clutch teeth on gear 34. The attachment A and saddle 10 move downwardly toward the work W on spindle 11 until the tap 48 is very near the work, whereupon another dog 40 on disc 36 trips lever 42 to shift clutch 35 into engagement with the clutch teeth on the face of gear 30. The movement of tap 48 is thus changed from downward rapid traverse to a downward feeding movement in direct proportion to the rate of rotation of spindle 11. This feeding movement continues until the cam surface 79 on previously-adjusted rod 80 engages the cam surface 78 on plunger 74, withdrawing the same from locking position and releasing the shaft 60 and spindle 47. Upon release of shaft 60, spring 63 forces it upwardly together with fork 59 and clutch 50. Upward movement of clutch 50 engages clutch element 55 that is rapidly rotating in the direction of rotation of spindle 11. Accordingly, spindle 47 and tap 48 begin rotating in the same direction as that of spindle 11 but at a very much faster rate. Release of the locking plunger also renders spindle 47 capable of axial movement. Therefore, the difference between these rates of rotation causes the tap 48 to "walk out" of the tapped hole. During this last operation, dogs 44 on disc 36 have stopped and re-started motor M₁ reversing its direction of rotation. When the tap 48 has moved out of effective engagement with the threads within the tapped hole, a dog 40 on disc 36 trips lever 42 to shift clutch 35 into engagement with gear 34 whereupon the saddle 10 and attachment A move upwardly at traverse speed. At the beginning of this upward movement of saddle 10, the weight of spindle 47 causes it to move downwardly and cam surface 78 moves away from cam surface 79 whereupon spring 76 tends to move plunger 69 to the right as viewed in Figs. 2 and 3. However, the cylindrical portion of shaft 60 prevents the movement of plunger 69 to the right due to the narrow portion of opening 72 engaging it. As the saddle 10 nears its upper limiting position, abutment 64 on shaft 60 engages stationary member 66 forcing shaft 60 and clutch 50 downwardly until the latter engages stationary collar 52. When clutch 50 engages collar 52, the flat portion 73 of shaft 60 will be within irregularly-shaped opening 72 thereby permitting spring 76 to force plunger 69 into locking position to hold clutch 50 in engagement with collar 52 and spindle 47 in its lowest position. The apparatus is now reset to begin a new tapping cycle of operation. Simultaneously with such re-setting of attachment A, a dog 40 on disc 36 trips lever 42 to move clutch 35 into neutral where it remains until released by the apparatus disclosed in the patents referred to.

Although the various features of the improved tapping attachment have been shown and described in detail to fully disclose one embodiment of this invention, it will be evident that numerous changes may be made in such details, and certain features may be used without others, without departing from the principles of the invention.

What is claimed is:

1. In a machine tool comprising a rotatable work-supporting member, a saddle adapted to be moved toward said member at a relatively slow rate of speed proportional to the rate of rotation of said member and to be moved away from said member at a relatively fast rate of speed; the combination with said saddle of a tapping attachment including a rotatable, axially-movable tap-supporting spindle; means for holding said spindle against rotation in a fixed axial position relative to said saddle during a tapping operation; and means operable between the downward and upward movements of said saddle for releasing said holding means and for rotating said spindle in the same direction of, but at a faster rate than the rotation of said member.

2. In a machine tool comprising a rotatable work-supporting member; a saddle adapted to be moved toward and away from said member; the combination with said saddle of a tapping attachment adapted to support a tap; and uni-directionally rotatable means for moving said saddle toward said member and for rotating said tap in the same direction of rotation as said work-supporting member to effect movement of said tap away from said member.

3. In a machine tool comprising a rotatable work-supporting member; a work piece adapted to be mounted on said member; a saddle; an attachment associated with said saddle adapted to support a tap for performing a tapping operation on said work; and uni-directionally rotatable means for moving said saddle toward said member during a tapping operation and for co-operating with the tapped work for moving the tap out of effective engagement with said work.

4. In a machine tool comprising a rotatable work-supporting member; a work piece adapted to be mounted on said member; a saddle; an attachment associated with said saddle adapted to support a tap for performing a tapping operation on said work; and uni-directionally rotatable means for moving said saddle toward said member during a tapping operation and subsequently for rotating said tap in the same direction as, but at a faster rate than the direction and rate of rotation of said member.

5. In a machine tool, a rotatable work-supporting member; a work pieced adapted to be mounted on said member; a saddle; an attachment associated with said saddle comprising a spindle adapted to support a tap and capable of axial movement relatively to said attachment; means for holding said spindle against rotation in a fixed axial position relatively to said attachment; uni-directionally rotatable means for feeding said attachment toward said work so that said tap can perform a tapping operation thereon; means for releasing said holding means when said tap reaches a predetermined position relatively to said work; and means for connecting said spindle to said rotatable means.

6. In a machine tool, a work-supporting member; a saddle; means adapted to move said saddle toward and away from said member at a relatively fast rate; separate means for moving said saddle toward said member at a relatively slow rate and for rotating said member; an attachment associated with said saddle comprising a rotatable spindle adapted to support a tap and capable of axial movement relatively to said attachment; releasable locking means for holding said spindle against rotation in a fixed axial position relatively to said attachment when said saddle is being moved toward said member; means for releasing said locking means and for connecting said spindle to said separate means when said saddle reaches a predetermined point in its path of travel; and means for re-setting said locking means when said saddle is moved away from said member.

7. In a machine tool, a rotatable work-supporting member; a work piece adapted to be mounted on said member; a saddle; an attachment associated with said saddle comprising a spindle adapted to support a tap and capable of axial movement relatively to said attachment; a clutch splined on said spindle; common means for holding said clutch in engagement with stationary means and for holding said spindle in a fixed axial position relatively to said attachment; uni-directionally rotatable means for feeding said attachment toward said work so that said tap can perform a tapping operation thereon; means for releasing said holding means when said tap reaches a predetermined position relatively to said work; and means for connecting said spindle to said rotatable means.

8. In a machine tool, a rotatable work-supporting member; a work piece adapted to be mounted on said member; a saddle; an attachment associated with said saddle comprising a spindle adapted to support a tap and capable of axial movement relatively to said attachment; a clutch splined on said spindle; a plunger provided with means for engaging and holding said spindle in one of its axial positions, said plunger also being provided with means for holding said clutch in engagement with stationary means to prevent rotation of said spindle; a resilient means for urging said plunger into cooperating position; uni-directionally rotatable means for feeding said attachment toward said work so that said tap can perform a tapping operation thereon; means for releasing said holding means when said tap reaches a predetermined position relatively to said work; and means for connecting said spindle to said rotatable means.

9. In a machine tool, a rotatable work-supporting member; a work piece adapted to be mounted on said member; a saddle; an attachment associated with said saddle comprising a spindle adapted to support a tap and capable of axial movement relatively to said attachment; means for holding said spindle against rotation in a fixed axial position relatively to said attachment; uni-directionally rotatable means for feeding said attachment toward said work so that said tap can perform a tapping operation thereon; adjustable stationarily mounted means for releasing said holding means when said tap reaches a predetermined position relatively to said work; and means for connecting said spindle to said rotatable means.

10. In a machine tool, a rotatable work-supporting member; a work piece adapted to be mounted on said member; a saddle; an attachment associated with said saddle comprising a spindle adapted to support a tap and capable of axial movement relatively to said attachment; a clutch splined on said spindle; a plunger provided with means for engaging and holding said spindle in one of its axial positions, said plunger also being provided with means for holding said clutch in engagement with stationary means to prevent rotation of said spindle; resilient means for urging said plunger into cooperating position; stationarily-mounted adjustable means adapted to retract said plunger when said tap reaches a predetermined position relatively to said work; and means for connecting said spindle to said rotatable means.

11. In a machine tool, a rotatable work-supporting member; a work piece adapted to be mounted on said member; a saddle; an attachment associated with said saddle comprising a spindle adapted to support a tap and capable of axial movement relatively to said attachment; uni-directionally rotatable means for feeding said attachment toward said work so that said tap can perform a tapping operation thereon; a clutch splined on said spindle; resilient means for normally urging said clutch in a direction to engage it with said rotatable means; common means for holding said clutch in engagement with stationary means against the action of said resilient means and for holding said spindle in a fixed axial position relatively to said attachment; and means for releasing said holding means when said tap reaches a predetermined position relatively to said work, whereby said clutch is shifted into engagement with said rotatable means.

12. In a machine tool, a work-supporting member; a saddle; means adapted to move said saddle toward and away from said member at a relatively fast rate; separate means for moving said saddle toward said member at a relatively slow rate and for rotating said member; an attachment associated with said saddle comprising a rotatable spindle adapted to support a tap and capable of axial movement relatively to said attachment; a clutch splined on said spindle; common releasable locking means for holding said clutch in engagement with stationary means and for holding said spindle in a fixed axial position relatively to said attachment; means for releasing said locking means and for connecting said spindle to said separate means when said saddle reaches a predetermined point in its path of travel; and means for re-setting said locking means when said saddle is moved away from said member.

13. In a machine tool, a work-supporting member; a saddle; means adapted to move said saddle toward and away from said member at a relatively fast rate; separate means for moving said saddle toward said member at a relatively slow rate and for rotating said member; an attachment associated with said saddle comprising a rotatable spindle adapted to support a tap and capable of axial movement relatively to said attachment; a plunger provided with means for engaging and holding said spindle in one of its axial positions, said plunger also being provided with means for holding said clutch in engagement with stationary means to prevent rotation of said spindle; resilient means for urging said plunger into cooperating position; means for releasing said plunger and for connecting said spindle to said separate means when said saddle reaches a predetermined point in its path of travel; and means for re-setting said plunger to hold said spindle against rotation in a fixed axial position relatively to said attachment when said saddle is moved away from said member.

14. In a machine tool, a work-supporting member; a saddle; reversible means adapted to move said saddle toward and away from said member at a relatively fast rate; uni-directionally rotatable means for moving said saddle toward said work at a relatively slow rate and for rotating said member; an attachment associated with said saddle comprising a rotatable spindle adapted to support a tap and capable of axial movement relatively to said attachment; a clutch splined on said spindle; resilient means for normally urging said clutch in a direction to engage it with said uni-directionally rotatable means; common means for holding said clutch in engagement with stationary means against the action of said resilient means and for holding said spindle in a fixed axial position relatively to said attachment; means for releasing said holding means when said tap reaches a predetermined position relatively to said work, whereby said clutch is shifted into engagement with said uni-directionally rotatable means; and means for re-setting said holding means when said saddle is moved away from said member.

15. An attachment for a machine tool comprising in combination, a housing; a spindle journaled in said housing and adapted to be axially-moved within limits; a rotatable shaft journaled in said housing; a clutch splined on said spindle; a clutch-shifting rod mounted for axial movement within said housing; resilient means for urging said rod and said clutch in a direction to engage said rotatable shaft; and means for releasably locking said rod in a position where said clutch is in engagement with stationary means, and for holding said spindle in a fixed axial position.

16. An attachment for a machine tool comprising in combination, a housing; a spindle journaled in said housing and adapted to be axially-moved within limits; a rotatable shaft journaled in said housing; a clutch splined on said spindle; a clutch-shifting rod mounted for axial movement within said housing; resilient means for urging said rod and said clutch in a direction to engage said rotatable shaft; a plunger having an opening through which said rod is adapted to pass; resilient means for urging said plunger into a position where said opening cooperates with means on said rod for holding said rod in a position where said clutch engages stationary means.

17. An attachment adapted to be mounted on a movable member of a machine tool comprising in combination, a housing; a spindle journaled in said housing and adapted to be moved axially a limited amount; a rotatable shaft journaled in said housing; a clutch splined on said spindle; a clutch-shifting rod mounted for axial movement within said housing; resilient means for urging said rod and said clutch in a direction to engage said rotatable shaft; a plunger for releasably locking said rod in a position where said clutch is in engagement with stationary means and for holding said spindle in a fixed axial position; means for releasing said plunger as said member moves a predetermined distance in one direction; and means for re-setting said plunger when said member moves to a predetermined point in the other direction.

EDWARD P. BULLARD, III.
ANDREW C. LINDMARK.